REDUCTION OF DIFFERENTIAL PHASE DISTORTION IN A SYSTEM FOR CORRECTION OF A VIDEO SIGNAL
Filed Oct. 3, 1968
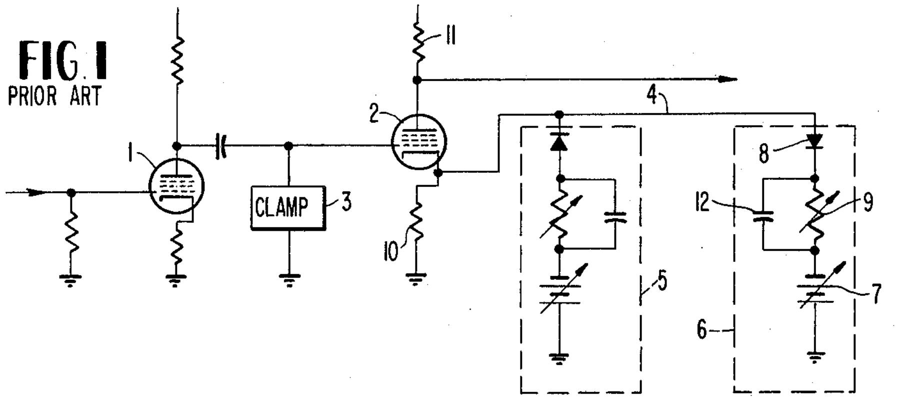
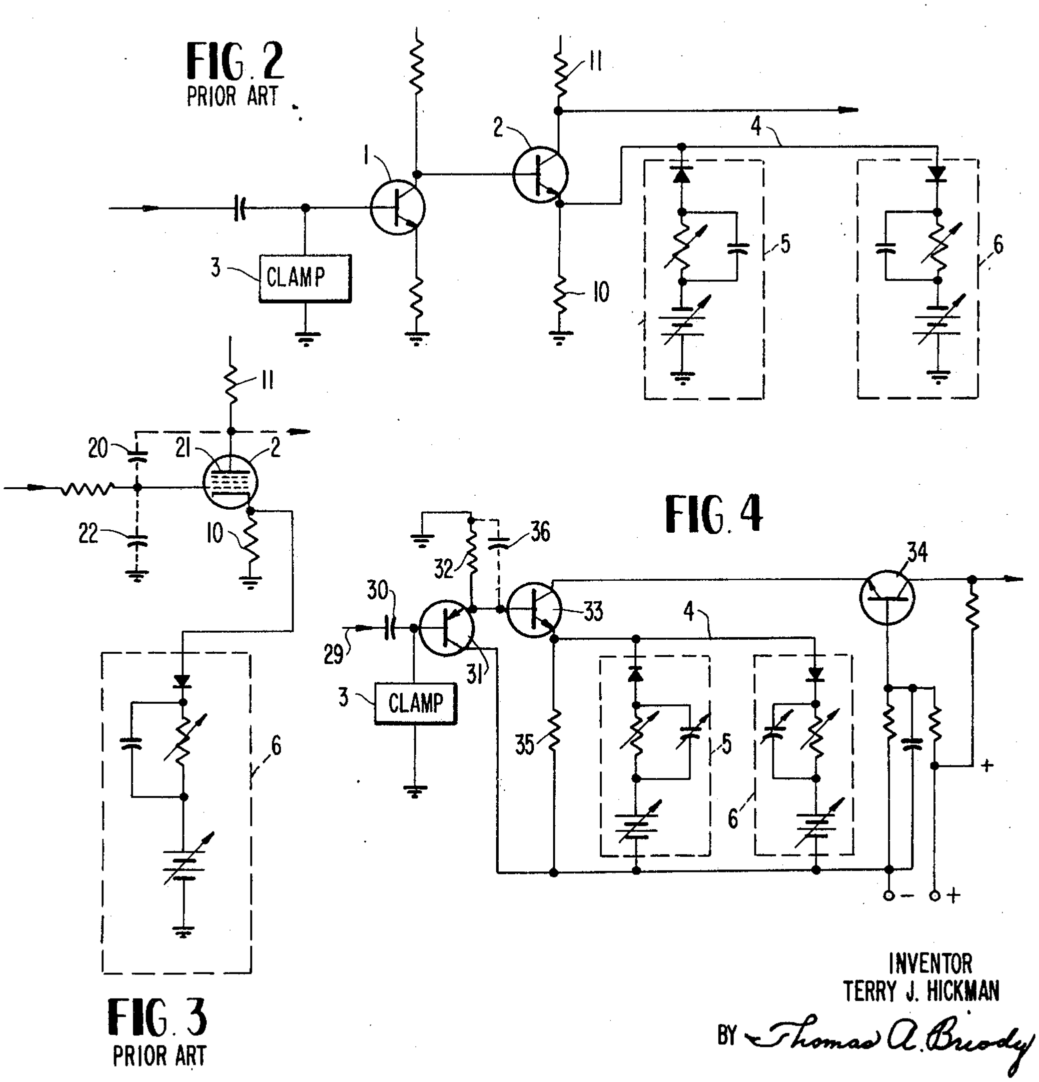
FIG. 2, FIG. 3, FIG. 4
PRIOR ART
INVENTOR
TERRY J. HICKMAN
BY Thomas A. Briody
ATTORNEY United States Patent Office 3,509,480

Patented Apr. 28, 1970

3,509,480

REDUCTION OF DIFFERENTIAL PHASE DISTORTION IN A SYSTEM FOR CORRECTION OF A VIDEO SIGNAL

Terry J. Hickman, North Syracuse, N.Y., assignor to General Electric Company, a corporation of New York Filed Oct. 3, 1968, Ser. No. 764,855
Int. Cl. H03g 3/30; H04n 5/18, 5/20
U.S. Cl. 330—20 4 Claims

ABSTRACT OF THE DISCLOSURE

An improved circuit for correcting the non-linear distortions introduced into color television signals by an active element having a non-linear transfer characteristic. Specifically, the circuit corrects for the distortion introduced by the modulated stage of a television transmitter, the distortion being in the form of compression of the sync and white regions of the signals. The improved circuit includes a low impedance emitter follower driver stage coupled to a video transistor-amplifier stage which in turn is connected in cascode with an output transistor amplifier stage. Such a circuit maintains differential phase distortion at a minimum by eliminating the effect of reactive components associated with the video amplifier stage and by eliminating the Miller effect of collector-to-base capacitance multiplication of the video amplifier stage.

BACKGROUND OF THE INVENTION

Field of the invention

The invention relates to a system for correcting a signal for the non-linear distortion caused by an active circuit having a non-linear transfer characteristic and, more particularly, to such a system which maintains differential phase distortion at a minimum while correcting for the distortion caused by compression of the white and sync regions of a color television signal.

Description of the prior art

It is a characteristic of active networks having non-linear transfer characteristics that they distort signals applied to them. Such non-linear active networks appear in color television transmitters and produce undesirable distortion effects on the video signal. Most often the network which produces such distortion is the modulation network.

The distortion is generally in the form of sync compression and white compression, referring to relative compression of the two amplitude extremes of a video signal. Sync compression results in an improper ratio of sync signal to video signal; if severe enough it also results in a desaturation of chroma information in the black regions of the picture. White compression results in a graying of extreme white portions of the picture and in desaturation of chroma information in the white portions of the picture.

Certain prior art systems have attempted to correct for this compression by selectively expanding regions of the signal to predistort these regions before application of the signal to a non-linear element. Such predistortion allows the inherent compression of the non-linear element to produce a signal of undistorted amplitude. However, this predistortion produces a signal having an undesired differential phase shift.

SUMMARY OF THE INVENTION

The object of the present invention is to provide a circuit for correcting for non-linear distortion of a signal without introducing substantial differential phase distortion.

The circuit includes a variable gain amplification stage arranged to have its input signal applied from a low impedance source to reduce the phase-shifting effect of the inherent equivalent capacitance between the control terminal and ground of the variable gain stage. The total voltage gain of the variable gain stage is also kept low to reduce the size of this inherent equivalent capacitance.

BRIEF DESCRIPTION OF THE DRAWINGS

FIGURE 1 is a schematic diagram of a prior art vacuum-tube circuit which corrects for non-linear distortion of a signal.

FIGURE 2 is a schematic diagram of a transistorized, direct-coupled prior art version of the circuit of FIGURE 1.

FIGURE 3 is a schematic diagram of the equivalent circuit of a segment of the prior art circuit of FIGURE 1 and is useful for explaining intrinsic capacitive effects.

FIGURE 4 is a schematic diagram of a preferred embodiment of a linearity correction circuit according to the present invention.

DESCRIPTION OF THE PREFERRED EMBODIMENT

A better appreciation of the present invention can be obtained by first referring in some detail to the prior art circuits illustrated in FIGURES 1–3.

FIGURE 1 illustrates a linearity correction circuit used in the prior art to compensate for non-linearities introduced by the modulating stage of a television transmitter. Circuits 1 and 2 are video amplifier stages. Connected between the two stages of video amplification is a clamp circuit 3 used for D.C. insertion. The clamp element is used because a video signal which has an inserted D.C. component is applied to the modulated stage. The distortion produced by the modulated stage is therefore partially a function of a bias level, and the predistortion circuit must also take this bias level into account.

As the video signal at the grid of amplifier 2 rises in the positive direction, the cathode output signal on line 4 also rises in the positive direction. Line 4 is connected to a negative threshold element 5 and to a positive threshold element 6 .

When the voltage on line 4 rises above a certain predetermined positive threshold value corresponding to the positive value set by a variable voltage source 7, a diode 8 begins to conduct. When diode 8 begins to conduct, it effectively places resistance 9 in parallel with the cathode resistor 10 of amplifier 2. After this threshold value has been reached, the gain is thus increased by an amount dependent upon the ratio between a plate resistor 11 and the effective parallel combination of resistors 9 and 10. Capacitor 12 is included in threshold element 6 to help to compensate for circuit time constant.

Threshold device 5 operates in a similar fashion to increase the gain when the signal on line 4 goes beyond some negative threshold voltage.

FIGURE 2 illustrates a prior art circuit similar to that of FIGURE 1, which uses transistors as the active elements rather than the vacuum tubes of FIGURE 1. The circuit of FIGURE 2 functions in the same manner as that of FIGURE 1 except that the clamp used for D.C. insertion is employed at the input of amplifier stage 1, and D.C. interstage coupling is used between amplifier stages 1 and 2.

The circuits of FIGURES 1 and 2 serve to correct for sync compression and white compression non-linearities. However, these circuits have the defect that substantial differential phase distortion is introduced in the signal in the amplitude regions where linearity correction takes place. An analysis of the A.C. circuit of FIGURE 3 shows why such phase distortion takes place.

FIGURE 3 shows stage 2 of the circuit of FIGURE 1. Capacitor 20 is the intrinsic plate-to-grid capacitance of the tube 21 used in amplifier stage 2. It can be shown that an effective intrinsic capacitance 22 from grid to ground is present in such a circuit and has a value proportional to the product of the capacitance of capacitor 20 and the voltage gain of the amplification stage 2. Therefore, if the voltage gain of the amplification stage is changed, the capacitance of capacitor 22 changes. Such a change in the voltage gain of the stage occurs when threshold element 6 reaches the threshold value.

The combination of capacitor 22 and the impedance in parallel with it forms a phase shifting network. The parallel impedance is a function of the output impedance of the first stage and the input impedance of the second stage and is relatively constant. Therefore, when the gain of stage 2 changes, the capacitance of capacitor 22 is changed, thereby changing the phase shift introduced by the phase shifting network.

It is clear then that the phase shifting of the chroma components of the video signal applied to the grid is not identical under the two conditions of stage gain. This difference in phase shift is defined as a differential phase shift and results in a color hue shift which is dependent upon luminance amplitude. A similar phase shift occurs in the second stage of the circuit of FIGURE 2.

FIGURE 4 is a schematic diagram of a circuit according to the present invention. An input signal is received on line 29 and arrives at capacitor 30. At the output of the capacitor, after having been clamped by clamp 3, the signal is applied to the base of a first-stage transistor 31. A resistor 32 is connected to the emitter of transistor 31 to form an emitter-follower amplifier. The first-stage output signal from the emitter of transistor 31 is applied to the base or control terminal of a second-stage transistor 33. Transistor 33 is connected at its collector or output terminal in cascode with a transistor 34 from which an output signal is derived. An emitter resistor 35 is connected to the emitter or common terminal of transistor 33.

The output on line 4 from the common terminal of transistor 33 is applied, as in the prior art, to the threshold devices 5 and 6, which are responsive to the amplitude level of the signal on line 4 to vary the gain of the second stage, thereby selectively stretching or amplifying with greater gain the portions of the input signal which are of the proper value to cause operation of the threshold circuits.

The emitter-follower transistor 31 provides a low impedance drive for transistor 33, thereby decreasing the effect of reactive components associated with transistor 33. In FIGURE 4, capacitor 36 corresponds to capacitor 22 in FIGURE 3. The phase shifting effect of capacitor 36 is substantially eliminated because it appears in parallel with a resistance 32. Thus, as the gain G of the amplifier is varied, there will be little change in the phase shift of the circuit due to the change in the value of capacitor 36.

The cascode connection of transistors 33 and 34 eliminates the Miller effect resulting from collector-to-base capacitance multiplication caused by transistor 33. Because the common base input impedance of transistor 34 is quite small, the voltage gain of transistor 33 is much less than unity, therefore eliminating the Miller effect as a major source of variable effective capacitance.

Of course, the circuit of FIGURE 4 is not limited to the use of only two threshold elements. In many cases it will be desirable to have a gain which increases somewhat as one value of voltage on line 4 is reached, and which increases an additional amount as a still greater value of voltage on line 4 is reached. Through the use in the threshold elements of voltage sources and resistors whose values are properly chosen, any desired threshold point may be used. Through the use of a number of threshold devices in parallel, each of which has a different value of voltage derived from its voltage source 7, any desired amplitude-gain function may be achieved.

The circuit of FIGURE 4 has been built and found to have quite good performance. Differential phase distortion on the order of .15° to .25° for a 2 to 1 gain increase has been observed. Frequency response of the stretching action of this circuit is flat to within .25 db up to 10 mHz. and to within .5 db to 20 mHz.

In a variation of the circuit of FIGURE 4, a shunt feedback amplifier follows the transistor 33. Again, there would be low distortion from such a circuit because of the small voltage gain of transistor 33. The basic requirement of such a circuit is that the effect of the Miller feedback capacitance be eliminated or reduced to a minimum, thereby keeping differential phase distortion low.

Of course, the circuit could be designed to use vacuum tubes or monolithic circuits instead of the transistors illustrated.

While the invention is applicable in many areas of signal processing, its primary utility is in the processing of television signals to expand the sync and white regions of the signal, thereby overcoming sync and white compression.

While the invention has been particularly shown and described with reference to a preferred embodiment thereof, it will be understood by those skilled in the art that various changes in form and details may be made therein without departing from the spirit and scope of the invention.

I claim:

1. A system for selectively stretching the amplitude of at least one portion of a signal within predetermined ranges of amplitude values, comprising:

(a) receiving means for receiving an input signal and for operating on said signal to generate a first stage output signal, said receiving means having a low output impedance, (b) a low-gain second stage amplifier having a control terminal, an output terminal, and a common terminal, wherein between said control terminal and said output terminal there is an inherently occurring capacitance C which effectively appears as an amplified capacitance GC between said control terminal and said common terminal, wherein G is the gain factor of said second stage, (c) means for applying said first stage output signal to said control terminal, (d) means connected to said common terminal and responsive to the amplitude level of said first stage output signal for varying said gain factor of said second stage when said amplitude level reaches a predetermined value, and (e) output means connected to said output terminal for deriving a system output signal therefrom having at least one selectively stretched amplitude portion, whereby said amplified capacitance effectively appears in parallel with said low output impedance so that changes in said amplified capacitance have little effect on the phase of an amplified signal.

2. A system according to claim 1 wherein said receiving means further comprises:

(a) a clamp means for maintaining said first stage output signal at a predetermined D.C. level, and (b) an emitter-follower first-stage amplifier circuit having an emitter resistor for providing said first stage output signal.

3. A system according to claim 1 wherein said output means further comprises an output amplifier for providing said system output signal.

4. A system according to claim 3 wherein said output amplifier and said second stage amplifier are arranged in a cascode connection.

References Cited

UNITED STATES PATENTS

| | | | |
|---|---|---|---|
| 2,583,345 | 1/1952 | Schade | 330—138 |
| 2,760,008 | 8/1956 | Schade | 330—138 |
| 2,904,642 | 9/1959 | Quinlan | 330—138 |
| 2,975,232 | 3/1961 | Breimer | 178—5.4 |

ROY LAKE, Primary Examiner

S. H. GRIMM, Assistant Examiner

U.S. Cl. X.R.

330—22, 29, 138, 140